Sept. 7, 1948. H. M. HEUVER 2,448,528
WIND TUNNEL BALANCE
Filed May 2, 1944 6 Sheets-Sheet 2
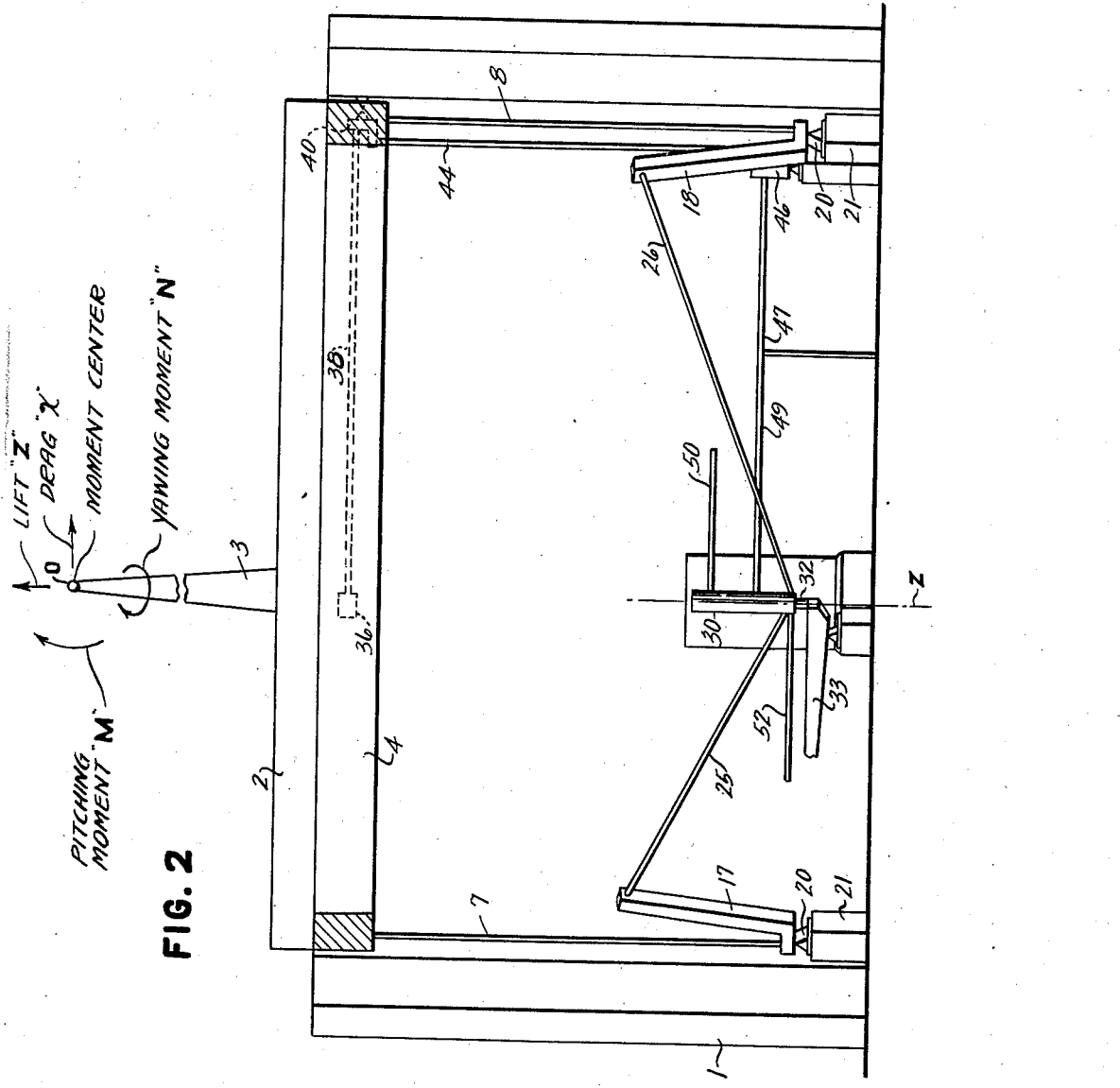

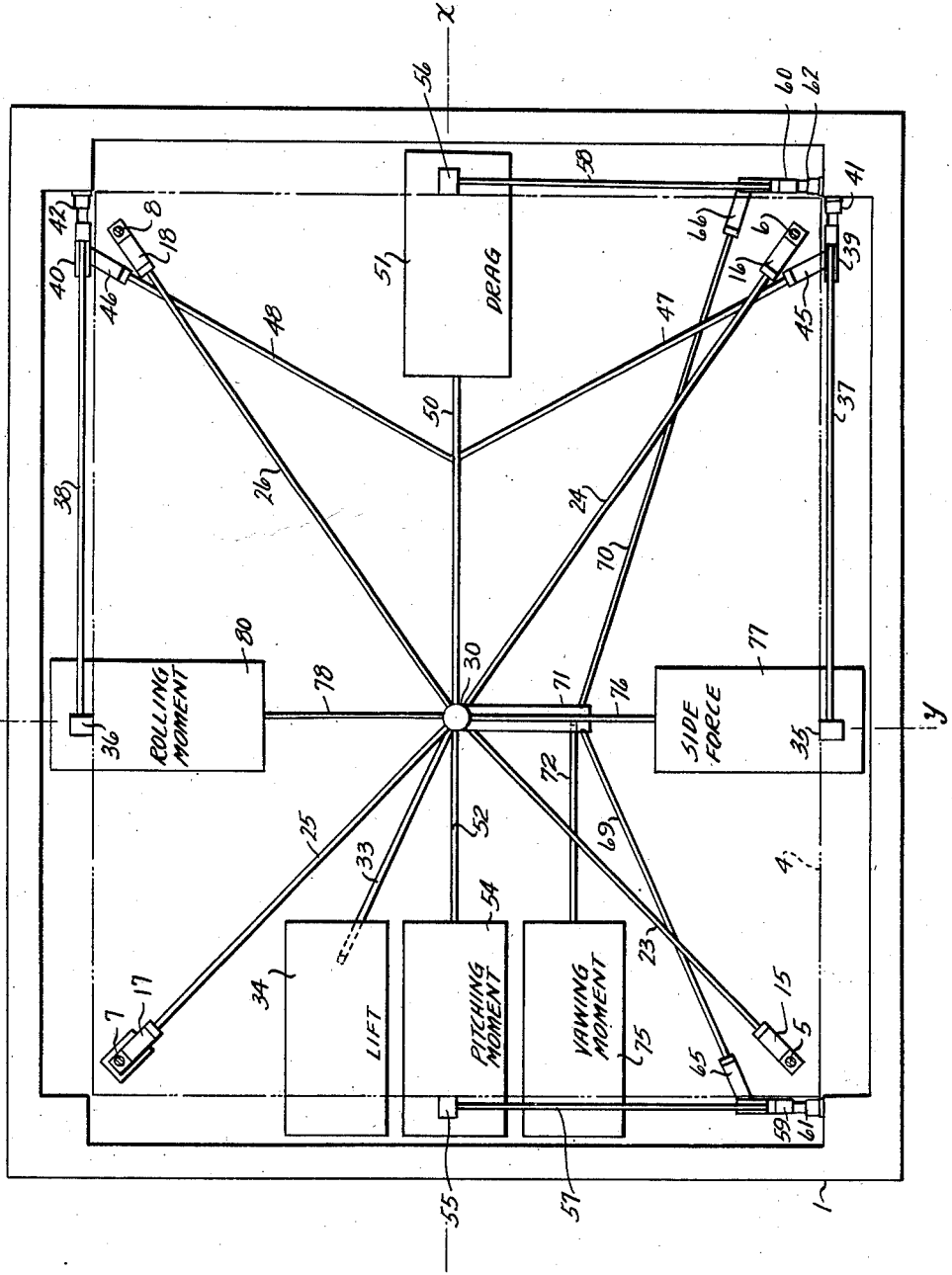

Sept. 7, 1948. H. M. HEUVER 2,448,528
WIND TUNNEL BALANCE
Filed May 2, 1944 6 Sheets-Sheet 3
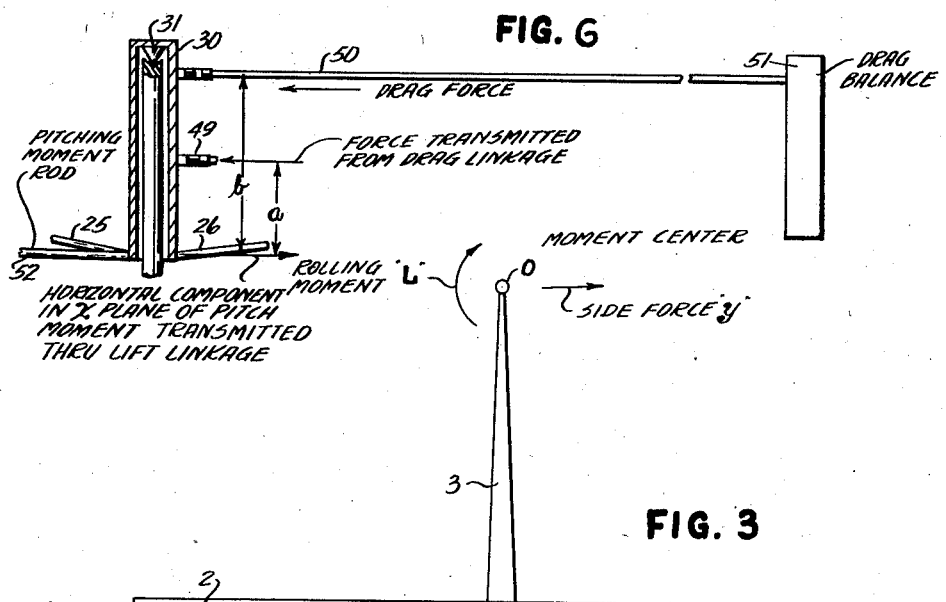
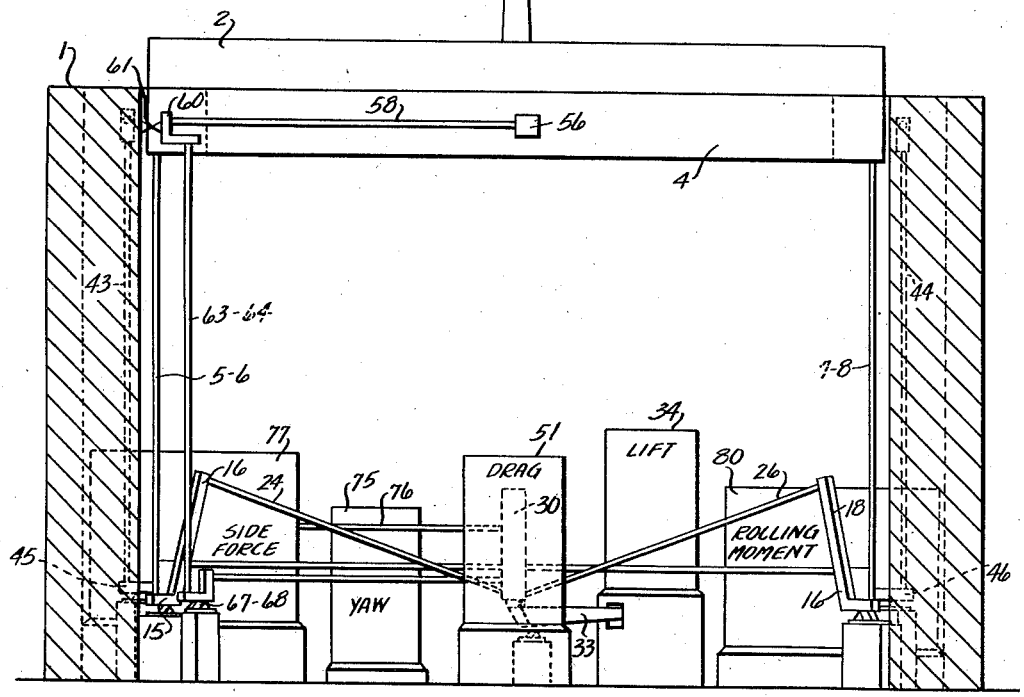
INVENTOR
HERBERT M. HEUVER
BY
ATTORNEYS Sept. 7, 1948.    H. M. HEUVER    2,448,528
WIND TUNNEL BALANCE
Filed May 2, 1944    6 Sheets-Sheet 4
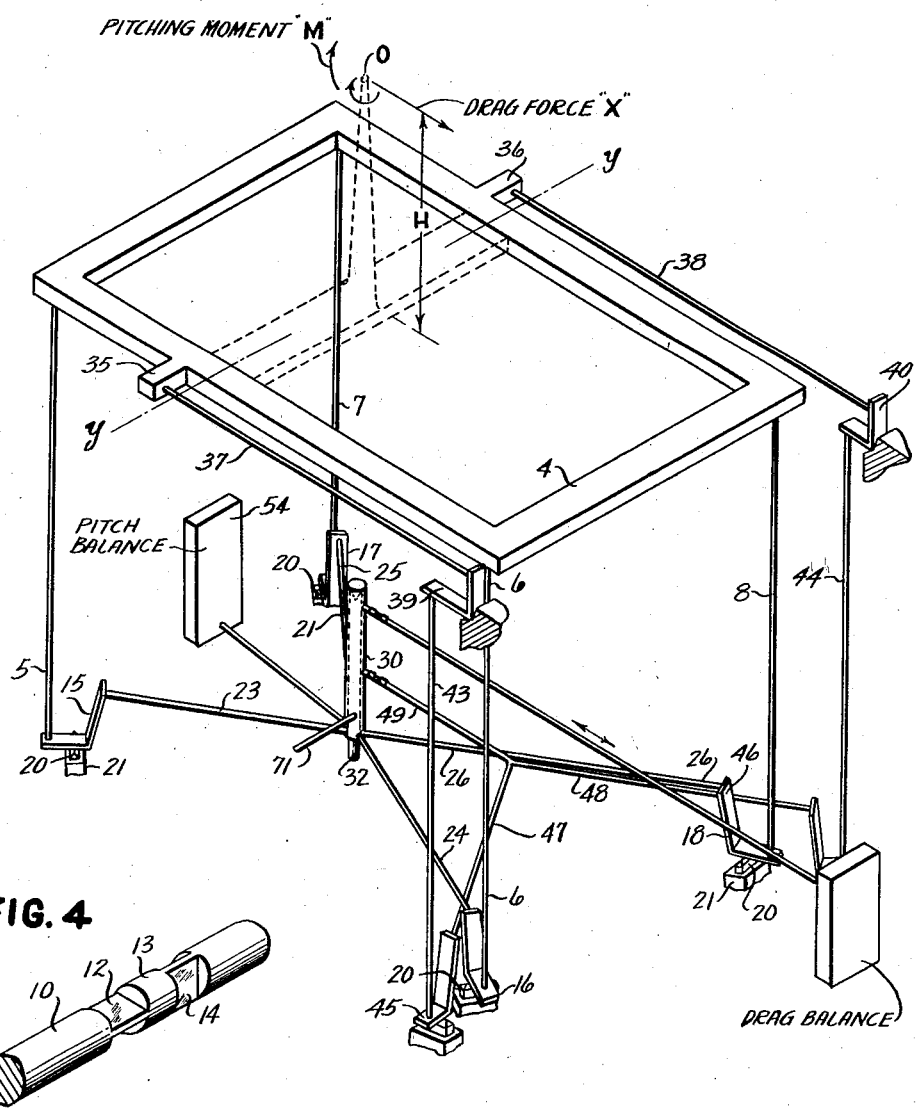

Sept. 7, 1948.            H. M. HEUVER            2,448,528
WIND TUNNEL BALANCE
Filed May 2, 1944                               6 Sheets-Sheet 5
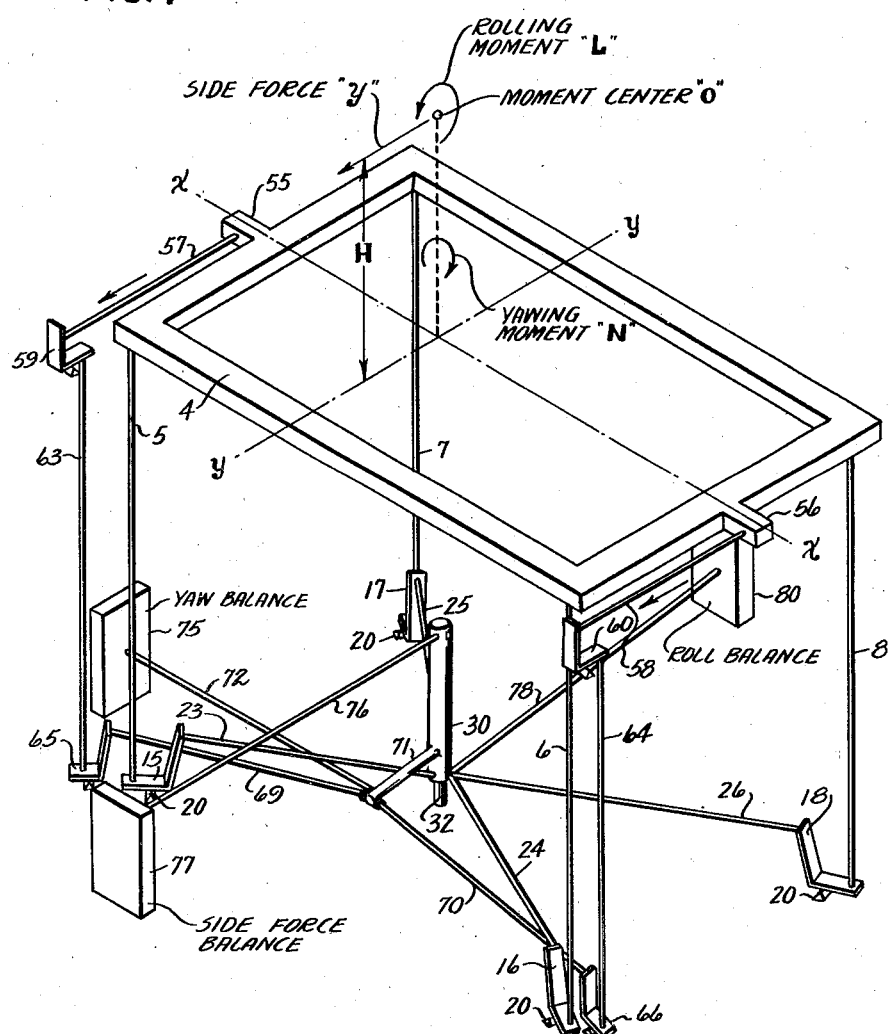
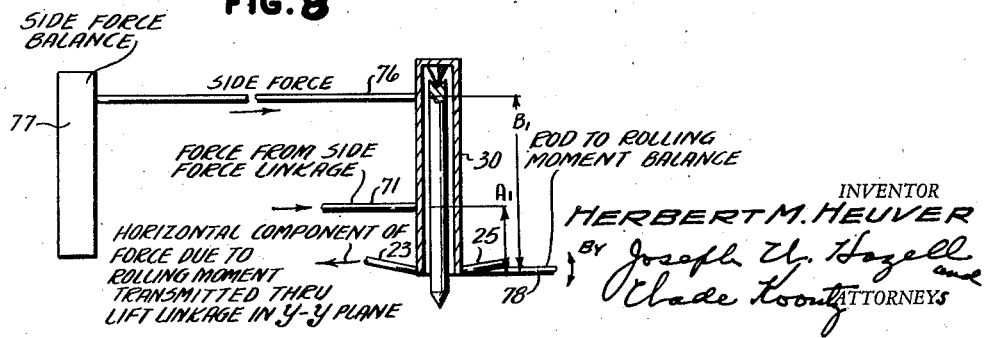

Sept. 7, 1948.  H. M. HEUVER  2,448,528
WIND TUNNEL BALANCE
Filed May 2, 1944  6 Sheets-Sheet 6

INVENTOR
HERBERT M. HEUVER
BY
ATTORNEYS

Patented Sept. 7, 1948

2,448,528

UNITED STATES PATENT OFFICE 2,448,528

WIND TUNNEL BALANCE

Herbert M. Heuver, Dayton, Ohio

Application May 2, 1944, Serial No. 533,786

9 Claims. (Cl. 73—147)

(Granted under the act of March 3, 1883, as amended April 30, 1928; 370 O. G. 757)

The invention described herein may be manufactured and used by or for the Government for governmental purposes, without the payment to me of any royalty thereon.

This invention refers to balances for wind tunnels and especially to balances adapted to multiple component measurement.

Various wind tunnel balances have been proposed in the past for measuring the forces and moments exerted on a model exposed to the moving air stream in the tunnel and in certain of those balances such as the NPL six-component balance and in the various wire suspension methods, it was possible to directly read the actual forces and moments exerted on the model, but such balances are not as adaptable for properly supporting the model in the air stream of a wind tunnel. In testing models and full size aircraft in wind tunnels it is necessary to provide a very substantial supporting structure for the model or airplane under test, and the requirements are generally such that the model or aircraft being tested must be supported at a considerable elevation above the weighing mechanism. In such balances, as I am at present aware, it has not been possible to directly read all of the forces and moments exerted on the model or aircraft under test and it has been necessary to correct the balance readings for moments introduced due to the elevation of the model above the weighing mechanism which requires considerable additional computation upon the completion of a test to determine the actual forces and moments exerted on the model or full size aircraft.

It is therefore an object of the invention to provide a wind tunnel balance suitable for testing models or full size aircraft in which all of the forces and moments acting on the model can be read directly on the balance scales without requiring the application of correction factors to the readings to allow for the effects of moments introduced by the model suspension system.

A further disadvantage of balance structures at present in use for testing models or full size aircraft lies in the fact that all moments occurring on the model or aircraft being tested are generally taken about a point other than the center of gravity location on the model representing the center of gravity location of the full size aircraft, and accordingly, it is necessary to recompute all moments in order to transfer the same to give the moments about the center of gravity of the full size airplane, which involves a great deal of numerical computation. In accordance with the present invention, means are provided whereby the model supports may be so adjusted that the axis of the airplane or model being tested may be positioned at any desired point with respect to the moment center of the balance system, that is, the moment may be taken either about the quarter chord point of the wing or about the center of gravity location, or about any other axes desired, so that the readings of the balances need not be corrected in order to determine the moments about some desired point or axis upon the model being tested. This feature results in the saving of a large amount of tedious computation work and facilitates the interpretation of the test results in a minimum of time.

It is therefore another object of the invention to provide, in combination, a balance giving direct indications of all of the forces and moments exerted upon a model and means for adjusting the position of a selected axis on the model with respect to a fixed moment center of the balance system, whereby the moments exerted about any desired axis of the aircraft may be directly determined from the readings on the balance system.

Other objects and details of the invention will become apparent to those skilled in the art by reference to the detailed description hereinafter given and to the appended drawings in which:

Fig. 1 illustrates schematically a top plan of a wind tunnel balance constructed in accordance with the invention, with the floating frame indicated in dotted lines for clarity of illustration;

Fig. 2 illustrates a view partly in section taken on line $x$—$x$ of Fig. 1;

Fig. 3 is an end view partly in section taken on line $y$—$y$ of Fig. 1;

Fig. 4 is a fragmentary view illustrating the details of a semi-universal rod terminal employed in the invention;

Fig. 5 is an isometric view illustrating those elements of the balance of Fig. 1 employed in measuring the drag force, and the pitch moment exerted on a model supported from the balance system;

Fig. 6 is a diagrammatic view illustrating the principle of compensation of the balance of Fig. 1 for eliminating pitching moments caused by drag forces exerted through the model suspension system;

Fig. 7 is a view similar to Fig. 5 illustrating the side force, rolling moment and yawing moment measuring system of the balance of Fig. 1;

Figure 9:
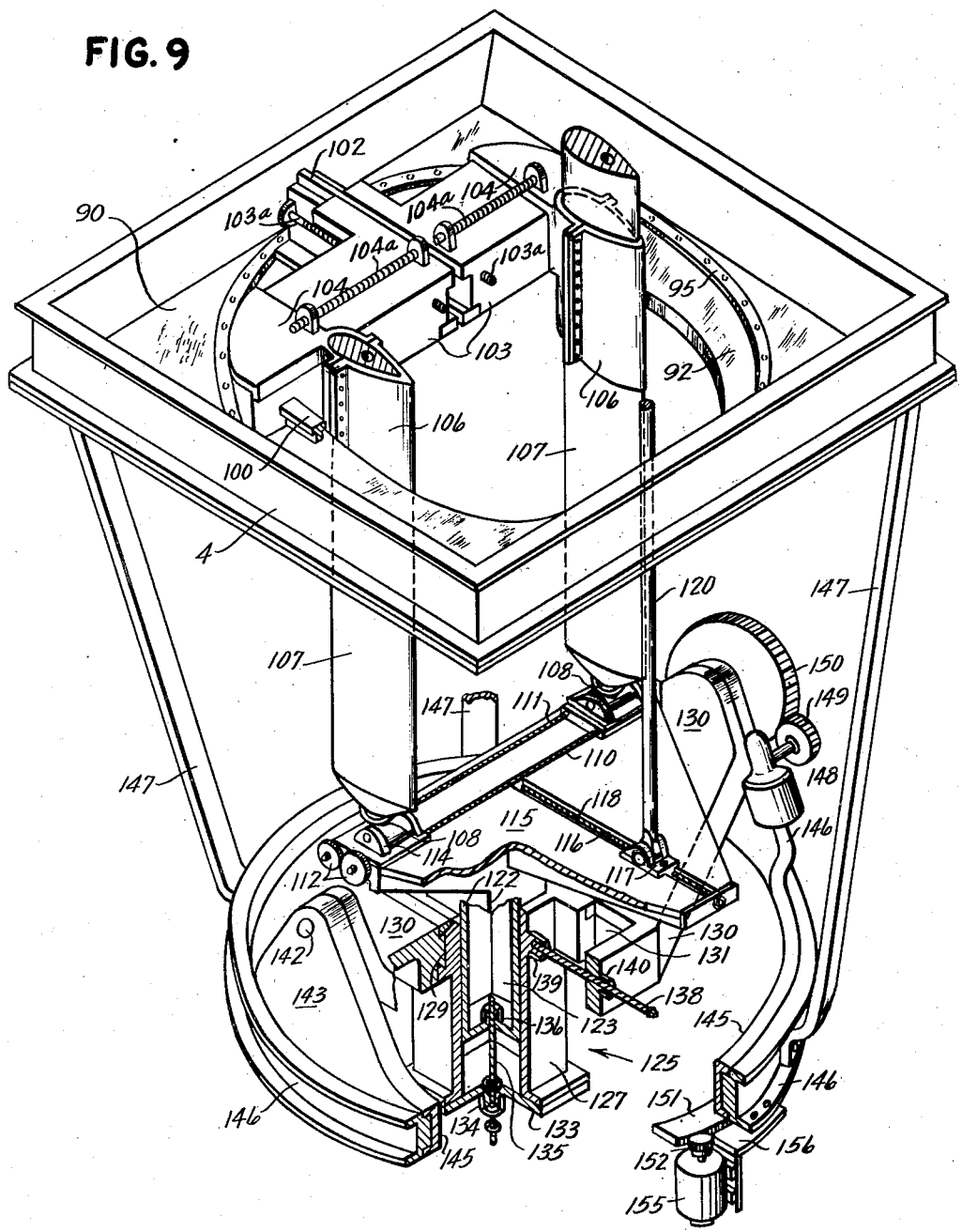

Fig. 8 is a view similar to Fig. 6 which illustrates the application of the means for compensating for the effect of moments introduced in the balance due to the side force acting through the model suspension system; and Fig. 9 is an isometric view illustrating a means for adjusting the position of a selected moment axis on the model with respect to the moment center of the balance illustrated in Fig. 1.

Referring now to Figs. 1 to 3, the reference numeral 1 illustrates a concrete or other enclosure positioned beneath the throat of a wind tunnel (not shown). This enclosure is adapted to enclose the balance mechanism and means for transmitting forces and moments thereto, and also serves to support the fixed parts of the balance mechanism. The reference numeral 2 indicates a base structure on which is mounted a suitable model support generally indicated by the reference numeral 3. The base structure and model support (see Fig. 2) are herein merely conventionally illustrated, but actually include mechanism for moving the model support to shift the model with respect to a fixed moment center O which forms an axis or point in space, as will be hereinafter more fully described with respect to Fig. 9. In discussing the balance mechanism, it will be, for the present, considered that all forces and moments to be measured by the balance system will be transmitted from the model to the vertical support 3 for further transmission to the balance mechanism through the base 2.

The base 2 is adapted to be secured to a rectangular open frame 4, hereinafter referred to as a floating frame, since the same is adapted to move upward, rearward or sideways, due to the exertion of lift, drag or side force, respectively, or is adapted to rotate about either axis $x$—$x$ or $y$—$y$ of Fig. 1, or to rotate about the vertical axis $z$—$z$, Fig. 2. In other words, the three possible forces and the three possible moments which can be exerted on a model tend to produce a similar linear or rotary movement of the floating frame 4. Floating frame 4 is supported by means of four vertical rods 5, 6, 7, and 8 respectively, each positioned at one of the corners of the frame. The rods 5 to 8, inclusive, are adapted to transmit only axial forces, this being insured by employment of a semi-universal rod joint or terminal such as illustrated in Fig. 4, in which flats such as 12 and 14, spaced apart by an intermediate section such as 13, allow free movement of the rod in planes at right angles to each other but permit the transmission of axial forces along the axis of the rod. Throughout the discussion of the structure hereinafter given, it will be assumed that rod joints of this type are employed on all members designed to transmit only axial loads. It will be seen that all vertical forces acting on the model will be transmitted through base 2 and floating frame 4 to the rods 5 to 8, inclusive, so that the sum of the forces in the rods is a measure of the lift acting in the direction of the Z axis (Fig. 2) exerted by the model. Although the forces in the respective rods may differ, due to the application of moments or couples transmitted from the model, the sum of the vertical loads in the rods will always equal the lift. The rods at their lower ends are connected to bell cranks 15 to 18, inclusive, each of which is supported by means of a knife edge 20, preferably of the flexible type, mounted on a rigid support 21, in turn supported by the foundation of the balance. It will be seen that while the rods 5 to 8, inclusive, are capable of transmitting lift forces, due to the fact that the rods are provided with semi-universal terminals such as illustrated in Fig. 4, they will be unable to resist any horizontal motion of the floating frame 4. The bell cranks 15 to 18, inclusive, have associated therewith respectively rods 23 to 26, inclusive, which are arranged so as to form an inverted pyramid, the rods being secured at their lower inner ends to a hollow floating or compensating lever 30, which is supported by means of a conical pivot or other type universal joint from the upper end of a rod 32, at which its lower end is universally connected to a horizontally extending balance beam 33 suitably supported on a fulcrum and connected at its outer end to a conventional lift balance 34 of the well-known automatic balancing recording type; that is, upon any change in load on the balance, an electric motor is automatically set into the action to bring the balance rapidly into equilibrium with the existing external loads, the balance being adapted to print the total force measured thereby on a tape at any time at the will of the operator, such automatic balances being well-known in the art and per se forming no part of the present invention. It will thus be seen that all lift forces will be transmitted from the floating frame 4 through the rods 5 to 8, inclusive, which in turn will be transmitted through the bell cranks 15 to 18, inclusive, respectively, with a change in direction and magnitude depending upon the mechanical advantage of the respective bell cranks and converted into axial forces in the respective rods 23 to 26, inclusive, so that the vertical component of the loads in each of these rods will be applied as a down force on the floating lever 30 and transmitted from said column to the rod 32, from whence the same will be transmitted by balance arm 33 to the lift balance 34 which will record the total lift force acting on a model supported on the vertical support 3. The geometry of the balance is so determined that the balance will measure all forces and moments about the axis or point of space O, Figs. 2 and 3, which for any balance will be determined by its respective design and may be made as desired to suit testing conditions.

In addition to transmission of lift forces which are the vertical components of the axial forces appearing in rods 23 to 26, inclusive, it will be noted that the rods 23 to 26 are each capable of exerting horizontal forces in two planes on the floating lever 30 so that, in addition to the effects of lift, forces may be exerted on the floating column due to the difference in the horizontal components of the force existing in the respective rods 23 to 26, inclusive. This difference results from the application of external moments to the model support 3 from air stream forces acting on the model.

The floating frame 4 is provided with two lugs or ears spaced on opposite sides thereof (note Fig. 1) such that any forces acting along the plane of XX, Fig. 1, will be transmitted by rods 37 and 38 universally connected to the respective lugs 35 and 36 and will be transmitted through respective bell cranks 39 and 40 which are pivotally supported on knife edges or the like 41 or 42 respectively secured to suitable supports anchored on the enclosure 1. The bell cranks 39 and 40 transmit loads from rods 37 and 38 to vertical rods 43 and 44, respectively, which are provided at each end with semi-universal joints of the type of Fig. 4 and are connected at their lower ends to bell cranks 45 and 46, respectively, each of which are suitably pivotally mounted on knife edges supported from the floor of the enclosure. The bell cranks 45 and 46 transmit their force by means of rods 47 and 48, respectively, to a horizontally extending link 49 (see Figs. 1, 2, and 5) which is secured at its inner end to the floating lever 30 by means of a semi-universal joint of the type of Fig. 4 so that the rod 49 is capable of transmitting only axial force to the floating lever 30 but is not capable of transmitting turning or other moments thereto. Axial forces in the plane of XX, Fig. 1, will be transmitted through rods 37 and 38, bell cranks 39 and 40, vertical rods 43 and 44 and bell cranks 45 and 46 to the rods 47 and 48 from whence the same will be applied by means of rods 49 to the floating lever 30. A rod in the plane of XX, Fig. 1, and positioned vertically above the link 49 transmits drag forces from the lever 30 to a conventional automatic balancing drag balance 51 of conventional construction, the rod 50 being semi-universally connected by means of a joint of the type of Fig. 4 to the floating lever 30 so that no moments may be transmitted either to or through the rod 50. On the opposite side of rod 50 and in the plane of XX is positioned a rod 52 which is universally connected at one end to lever 30 and serves to transmit forces as a measure of moments in the plane of XX from the floating lever 30 to a conventional automatic balancing and recording balance 54 which records the pitching moment, the rod 52 being connected to the lever 30 at the point of intersection of rods 23 to 26, inclusive.

The floating frame 4 is stabilized against any movement in the plane of $x$—$x$, Fig. 1, caused by drag force, such as X, Fig. 2, since the drag balance 51 will supply a reaction force opposing the forces transmitted thereto from the linkage system above described. It will be noted, however, by reference to Figs. 2 and 6, that the drag force X exerts a moment of (X) $x$ (H) on the floating frame 4, and causes an unequal distribution of loads in the lift rods 5 to 8, inclusive, which in turn produces an inequality of the horizontal components of the force in the lift transmission rods 23 to 26, inclusive, which tends to produce a horizontal force at the point of intersection with lever 30, which is a measure of the moment (X) $x$ (H) in the plane of X—X, Fig. 1, acting on the model support 3 (note Fig. 2). It will be also evident that any lateral or rolling moments exerted by the model on the model support 3, Fig. 2, will in a similar manner produce horizontal forces acting on the floating lever 30. By means of the particular arrangement of the linkage, the effect of the drag force in producing a pitching moment on the floating frame 4 is neutralized in the pitch and drag linkage, so that any horizontal forces produced by the moment "X $x$ H" on the floating lever 30 will be compensated for by the horizontal force transmitted to the floating column by the drag linkage, making the force produced in rod 52 a measure of the pitching moment about the moment center 0.

The floating frame 4 is provided with oppositely positioned lugs 55 and 56 spaced 90° from the axis of lugs 35 and 36, which have connected thereto by semi-universal joints of the type of Fig. 4 the rods 57 and 58, respectively, which rods are connected to bell cranks 59 and 60, respectively, pivotally supported by knife edges 61 and 62, respectively, (note Fig. 1) which are anchored to the walls or other suitable stationary structure of the enclosure 1 and all side force; that is, forces acting in the plane of axis $y$—$y$, Fig. 1, will be transmitted through such rods to the bell cranks, and similarly all turning or yawing moments exerted upon the floating frame 4 will be transmitted through said rods because of the inability of rod 49 of transmitting moments to the floating lever 30. The bell cranks 59 and 60 have connected thereto, respectively, the vertical force transmitting rods 63 and 64 (note Fig. 3), which rods are provided at each end with a semi-universal terminal fitting of the type of Fig. 4 and connected at their lower ends to bell cranks 65 and 66, respectively, which are suitably supported by means of flexible knife edges such as illustrated at 67—68, Fig. 3. The bell cranks 65—66, Fig. 1, transmit forces to horizontally extending rods 69 and 70, respectively, which are semi-universally connected at their inner ends in a common pivoted juncture to an arm 71 secured to the floating lever 30 (note Fig. 1) in a manner to transmit only axial force thereto. The pivoted juncture of rods 69 and 70 with the rod 71 is connected by means of a link 72 to a yawing moment balance 75 also of the automatic self-balancing and recording type, the rod 72 being provided at its ends with semi-universal joints of the type of Fig. 4 and therefore can transmit only axial forces to the yawing moment balance. Immediately above the rod 71 is positioned a rod 76, which is semi-universally connected at its outer end to the floating lever 30 and at its inner end is connected to an automatic self-balancing and recording side force balance 77. On the opposite side of the side force transmitting rod 76 and in the plane thereof a horizontal universally connected rod 78 is secured to the floating lever 30 (at the point of intersection of rods 23 to 26) such that it may transmit certain forces acting on said column in the plane of $y$—$y$ Fig. 1, to a rolling moment balance 80 also of the automatic balancing and recording type.

Since the rod 59, associated with the drag measuring means (previously described) is incapable of transmitting any turning or yawing moment exerted on the frame 4 to the floating lever 30 and hence is incapable of transmitting counter-reacting forces to the frame 4 from the balance system, all turning or yawing moments exerted on the frame 4 about the axis ZZ, Fig. 2, must be transmitted from lugs 55 and 56, links 57 and 58 and bell cranks 59 and 60 to the vertical rods 63 and 64 from whence same will appear as components of the respective tension and compression forces in the rods 69 and 70, and since any torque or couple producing turning of the floating frame 4 about the axis Z—Z, Fig. 2, will produce horizontal components of the forces in rods 69 and 70, Fig. 1, which are additive and their sum will be a measure of the yawing moment exerted on the frame 4 by the model and it will be transmitted through the yawing moment rod 72 directly to yawing moment balance 75 which in turn will produce reacting forces counteracting any tendency of the frame 4 to rotate in yaw about axis Z—Z, Fig. 2. In a similar manner any side force transmitted to the frame 4 in the plane of Y—Y, Fig. 1 will also be transmitted to rods 69 and 70 such that the algebraic sum of the components of the forces in these rods in the Y—Y plane will appear in rod 76 as a measure of the side force which is indicated on balance 77, however, the arrangement is such that any rolling moments produced by side force acting on the model support 3, Fig. 2, and tending to cause rotation of the frame 4 about axis X—X, Fig. 1, will be compensated in a manner similar to that employed in compensation for pitching moment due to drag, and hence the rolling moment balance 80 will read only actual rolling moments exerted on the model and not those due to side force acting through the distance H, Fig. 2. The means for compensating for the pitching moments due to drag and the rolling moments due to side force will now be more fully described with reference to Figs. 5 and 8, inclusive.

The means for compensating for the pitching moment introduced by the drag force will now be considered in more detail with reference to Fig. 5 in which the elements taking part in the measurement of drag and pitch are illustrated with the remaining structure removed. As seen in Fig. 5 and as previously described, the lugs 35 and 36 secured to the floating frame 4 are adapted to transmit any forces acting in the plane X—X, such as the drag force X through rods 37 and 38 to bell cranks 45 and 46 which then transmit the respective forces through rods 47 and 48 to a single rod 49 provided at its inner end with a semi-universal joint of the type of Fig. 4, at which point it is secured to the floating lever 30. Since the member 49, by virtue of its universal connection to floating lever 30, is incapable of transmitting a torsional moment thereto even though yawing moments tending to rotate the frame 4 exists, the forces in rods 37 and 38 will be equal since all yawing moments will be reached by rods 57 and 58 and such rotational moments can not be imparted to the lever 30 my means of rod 49 which is capable only of transmitting axial forces. It is, therefore, seen that while forces may be set up between rods 37 and 38, due, for example, to the existence of a yawing moment such as indicated by N, the rod 49 is incapable of transmitting any horizontal components of such forces to the floating lever 30, and since there must be equilibrium in the horizontal plane, the sum of the forces on rods 37 and 38 must be equal to the actual drag force X, which is therefore transmitted except as modified by the mechanical advantages of the various transmitting bell cranks to the rod 49, and accordingly floating lever 30 is subjected to the force tending to displace the same in the X plane and such force is proportional to the drag force X transmitted to the frame 4 from the point 0 through the model suspension system indicated by support 3. It is also apparent, as previously described, that the drag force X acts through a distance H above the frame 4 and accordingly tends to tilt the frame about the axis Y—Y of Fig. 1 and produce a pitching moment on the frame. The pitching moment introduced by drag force X on the frame 4 tends to increase the lift forces in rods 5 and 7 and to decrease the lift forces in rods 6 and 8, and accordingly produces similar variation in the forces transmitted through rods 23 and 25, and 24 and 26, respectively. The horizontal components in the X—X plane of the forces in respective rods 23 to 26, inclusive, will so combine additively as to produce a force in the floating lever 30, due to the pitching effect exerted by the drag force on the floating frame 4, and it will be noted that this force is applied at the point of intersection of rods 23 to 26, inclusive, and to the floating lever 30 below the axis of the drag force transmitting rod 49, and the arrangement is such that compensation is effected so that the drag force produces at the point of intersection of rods 23 to 26, inclusive, and in the plane of rod 52, an equal and opposite force on the floating lever 30 to that which would be produced in rod 52 by the pitching moment introduced by the drag force. This compensation will be more apparent by reference to Fig. 6 in which it is seen that the horizontal component of the forces transmitted through the lift linkage, due to the pitching moment due to drag in the X plane, is transmitted to the lever 30 at a distance $a$ below the axis of rod 49, and such horizontal component acts in the opposite direction from the force transmitted to rod 49 from the drag linkage. A net force proportional to the drag force is transmitted by link 50 directly to the drag balance 51, and such link is positioned at a distance $b$ above the point of attachment of the lift links 23 to 26, inclusive, thereto, and by the proper design of the structure, distances $a$ and $b$ can be so made in conjunction with the mechanical advantages of the various bell cranks transmitting forces to the floating lever that the force transmitted through rod 49 produces an equivalent force at the point of intersection of the rods 23 to 26, inclusive, and opposes the sum of the horizontal components in the X—X plane of the force transmitted to the lever by lift links 23 to 26, inclusive, due to the pitching moment introduced by the drag force, and accordingly there will be no tendency for the lever 30 to rotate in the plane of X, and the force transmitted through rod 50 to drag balance 51 will be a true numerical measure of the actual drag force X; that is, all values of the force transmitted through rod 50 will be proportional to X. Referring again to Fig. 6, it is, however, apparent that the drag force transmitted to floating lever 30 through rod 49 is capable of producing a force at the point of connection of rod 52 to said floating lever which is equal and opposite to the pitching moment due to the drag force, and if there is any excess pitching moment transmitted to the floating frame 4 from the model support 3 in addition to the pitching moment due to the drag force, the horizontal components in the X—X plane of the forces transmitted through rods 23 to 26, inclusive, will be in excess of the forces arising from pitching moment due solely to drag, and consequently such additional force will be exerted upon the lever 30 for transmission by means of rod 52 directly to the pitch balance 54, which will thus measure only the pitching moment on the frame 4 due to forces about the point 0 on the model. By means of the compensating mechanism above described, the drag balance 51 will at all times give a reading directly proportional to the drag, and pitching moment balance 54 will indicate the true pitching moment acting about the moment center 0 due to the aerodynamic forces acting on the model, and if no pitching moment is exerted on the model support about the point 0, the pitch balance 54 will read zero. The same method of compensating for the effect of forces acting on the model support due to elevation of the model above the floating frame 4 as employed in compensating for the pitching moment due to drag is also employed in compensating for rolling moment introduced by any side force acting on the model, as best illustrated in Fig. 7.

Referring to Fig. 7 and as previously described above with respect to Figs. 1 to 3, it is apparent that any yawing moment, such as indicated by "N," will produce rotation of the floating frame, and this frame will be angularly displaced unless a contrary reaction force is transmitted thereto from the balance mechanism, and similarly any transverse force, such as the side force Y acting in the plane Y—Y, will produce a transverse displacement of floating frame 4, and the forces due either to yawing moment N or side force Y will be transmitted from the frame 4 by means of lugs 55 and 56 through rods 57 and 58, bell cranks 59 and 60 to vertical rods 63 and 64 and then by means of bell cranks 65 and 66 to rods 69 and 70 as previously noted. The rods 69 and 70, as previously noted, are pivotally connected to the outer end of a rod or arm 71 which is rigidly secured as by welding to the floating lever 30, the rigid connection being employed for stabilizing the lever. Any yawing moment acting on the frame 4 will produce a motion of rod 57 in one direction and a contrary motion of rod 58, which will produce forces acting in rods 69 and 70, which will have components in the plane of Y—Y, equal and opposite, and hence will cancel, while in the plane of X—X the components will be additive and will produce a net force acting at the pivotal connection of rods 69, 70 and 71, which will however be directly transmitted from said connection by means of a rod 72 to the yawing moment balance 75 of the automatic self-recording type so that upon any displacement of the common pivotal connection of rods 69, 70, 71, and 72, the balance 75 will automatically produce a reaction force which will counter-balance the yawing moment and hence apply reacting forces backwards to lugs 55 and 56, tending to serve as a reaction against the existing yawing moment and prevent rotation of the frame 4. The actual displacement of the frame will at the most amount to only a few one-thousandths of an inch, so that any forces arising due to deflection of the semi-universal joints such as illustrated in Fig. 4 will be of a negligible magnitude. Any forces transmitted by lugs 55 and 56 due to side force such as Y of Fig. 7 will also be transmitted to rods 69 and 70 such that the components of the forces in rods 69 and 70 in the plane of Y—Y will be additive and will be transmitted by arm 71 as an axial force tending to displace the floating lever 30 in the Y—Y plane. It will be apparent, however, that any side force acting at moment center 0 will produce a rolling moment L equal to Y, the side force, times distance H and this will produce an inequality in the forces transmitted through the pairs of lift rods 5 and 6, and 7 and 8, and hence the difference in the forces transmitted through lift rods will appear as components of force in the plane of Y—Y derived from the rods 23 and 26, inclusive, so that there will be a net component of force acting in the plane of Y—Y on lever 30 at the point of intersection of the rods in addition to the force exerted through the arm 71. As seen in Fig. 8, the horizontal components in the plane of Y—Y of forces transmitted through rods 23 to 26, inclusive, due to the rolling moment of the side force acts in the opposite direction from the force transmitted axially through arm 71 due to the side force and, since the arm 71 is positioned at a distance A₁ above the point of intersection of the rods 23 to 26, inclusive, by proper choice of this distance, the force in rod 71 may produce an equivalent force at the point of intersection of lift rods 23 to 26, inclusive, which will be exactly equal and opposite the net force due to side force rolling moments, and the force in rod 76 positioned a distance B₁ above the point of attachment of rods 23 to 26, inclusive, is a true measure of the side force being directly proportional to the force in rod 71. It is thus apparent that positioning a model above the floating frame 4 will produce a rolling moment on frame 4, due to the existence of any side force acting on the model, but by means of the compensating linkage employed, such rolling moment rod 78 will be zero and hence will not record a rolling moment on balance 80 (Fig. 7) due to side force acting at distance H. However, any additional rolling moment other than that due to side force acting at distance H will be transmitted to the floating frame 4 and through the lift rods 5 to 8, inclusive, and appear as a force acting in the Y—Y plane on lever 30 at the juncture of rods 23 to 26, inclusive, which will be in excess of that previously described as due to the rolling moment of the side force acting at distance H. Such additional force will then appear as an axial load in rod 78, which will be transmitted directly to the rolling moment balance 80 which will accurately record the value of the rolling moment about the moment center 0 and will produce a reaction force acting in a reverse sense which will be transmitted to floating frame 4 so that no actual displacement of the same will occur. It is seen that the method of compensating for rolling moment due to side force is substantially the same as that employed for compensating for pitching moment due to drag.

In the force measuring system heretofore described, the forces transmitted to the respective balances are each proportional to the loads or moments to be measured, and suitable modifying mechanism is incorporated in the balances to enable the same to directly record the actual numerical value of the respective forces and moments so that no computation work will be required. The balances are preferably of the beam type, so that when in equilibrium with the external applied forces there will be no actual displacement of the floating frame 4, any actual displacement being limited to such a small value that the geometry of the balance system will be unaffected.

The balance arrangement above described is so designed that the balances measure the forces and moments on a model or full size airplane about a point 0 which is a distance A from the centerline of lift rods 5 and 7 and on the axis Y—Y, Figs. 2 and 3, and positioned distance H above the plane of rods 37 and 38, 57 and 58. The point 0 is therefore fixed by the original design and is independent of the position of the model in a longitudinal plane with respect to the point 0, and therefore by shifting the model the forces and moments may be determined about any selected axis on the model such as the quarter chord point on the wing or the axis on the model passing through the point representing the center of gravity location of the full size airplane.

One form of construction enabling the model supports to be shifted to change the position of the model with respect to the fixed moment center 0 is illustrated in Fig. 9. It is to be understood that this structure is intended to be used in place of the model support 3, Figs. 2 and 3, which was merely a showing of a means for transferring forces and moments to the floating frame 4.

As seen in Fig. 9, the floating frame 4, corresponding to the same element Figs. 2 and 3, is provided with a circularly apertured bottom plate 90 which receives a ring 92, and is provided with removable guides 95 on its upper and lower side to retain the ring in assembled relation, suitable anti-friction bearing rollers (not shown) being provided between the guides 95 and the plate 90 so that the ring 92 may be rotated relative to frame 4 with a minimum of friction, permitting rotation of the model support system relative to the balance such as required for tests of the model in yaw.

The plate 92 is provided with two symmetrically spaced T rails 100 (only one shown) and a centrally positioned guide rail 102. The guide rails 100 and 102 serve to support identical longitudinally movable carriages 103 adapted to be adjusted in position along the rails by any suitable means, such as lead screws 103a. Two identical carriages 104 are respectively mounted for sliding lateral movement on the carriages 103 and adapted to be simultaneously moved inward or outward from the plane of symmetry by a lead screw arrangement or the like such as lead screws 104a.

Guides 106 are respectively secured to the carriages 104 and serve as guides for respective support struts 107 which, above the plane of frame 4, may project through the ring 92 and extend upward through the frame 4 into tunnel testing chamber for attachment to the object being tested. The portions of the struts 107 projecting into the air stream are enclosed within streamline housings supported out of contact with the struts, the housing (not shown) being adjustable so as to be aligned with the struts. Each of the struts 107 is provided with suitable attachment fittings to which the model or airplane being tested may be secured in a well-known manner.

The struts 107 are universally pivotally connected at their lower ends to fittings 108 which are respectively mounted for feeding movement each on one of two lead screws 110 and 111 which are threaded of the same hand and interconnected by gears 112 and adapted to be simultaneously rotated in opposite directions by means (not shown) to cause an equal movement of struts 107 towards or away from the plane of symmetry. The lead screws 110 and 111 are journalled in brackets 114 mounted on a plate 115 which is longitudinally slotted as at 116 to serve as a guide for an adjustable attachment fitting 117 adapted to be longitudinally adjusted by means of a lead screw 118. The fitting 117 serves as a pivotal support for the lower end of a supporting strut 120 which is adapted to be connected to the model to be tested adjacent the rear portion to the fuselage. The plate 115 is supported by plates 122 which unite with other plates 123 to form a rectangular guide pedestal 125 slidable vertically in a hollow rectangular guide 127 which in turn is slidably supported on dovetail guides 129 formed in a yoke member 130 centrally apertured as at 131 to provide for axial movement of the guide 127. The guide 127 is provided with a bottom wall 133 which is provided with a journal bearing 134 for a jack screw 135 which engages a threaded bore 136 in a bottom wall 137 of the pedestal 125 so that manual or power rotation of jack screw 135 will raise or lower the pedestal 125 relative to guide 127 and yoke 130. A lead screw 138 is rotatably connected at its inner end as at 139 to the guide 127 and at its outer end engages a threaded bore 140 in the yoke 130 so that by manual or power rotation of screw 138 the guide 127 and elements supported thereby may be longitudinally adjusted with respect to yoke 130.

The yoke 130 is supported by means of trunnions 142 (only one shown) which are rotatably journalled in bearings provided in lugs 143 formed integral with a semi-circular ring 145 rotatably mounted in a circular ring 146 which is rigidly secured by means of braces 147 to the floating frame 4. A reversible electric motor 148 is mounted for ring 146 and geared by means of gears 149 and 150 to one of the trunnions 142 so that the yoke 130 may be tilted about the trunnion axis and through struts 107 and 120 act as a parallelogram linkage to cause a change in angle of attack of the model equal to the angle of tilt of the yoke 130.

A gear sector ring 145 meshes with a gear 152 driven by a reversible electric motor 155 which is mounted on a bracket 156 secured to stationary ring 146, and energizing of the motor causes the model support assembly to rotate in azimuth so that the model may be yawed with respect to the air stream.

Since the moment center of the balance system is a fixed point in space, it is necessary to position the model or airplane to be tested such that a predetermined moment axis on the airplane passes through the moment center of the balance. By means of the lateral spacing adjustment provided by lead screws 110 and 111, the struts 107 may be spaced for connection to the fittings on the wings or landing gear of the model, and similarly lead screw 118 provides for longitudinal adjustment of strut 120 so that the latter may be readily connected to a third supporting point on the model or airplane being tested. It is also essential that the selected axis of the model be co-planar with the axis of the trunnions 142 and this may be obtained by shifting the guide 127 and pedestal 125 by means of lead screw 138. By raising or lowering pedestal 125 relative to guide 127 by adjusting jack screw 135, the model may be adjusted in the vertical plane.

The longitudinal axis of the model being tested may be aligned with or yawed with respect to the air stream by rotation of the model support assembly by motor 155, and the angle of attack may be changed by rotation of yoke 130 by motor 148 as previously described.

It will be apparent to those skilled in the art that variations may be made in the structure illustrated and described without departing from the scope of the invention as defined in the appended claims.

I claim:

1. In an aerodynamic balance for wind tunnels, a model support, a floating frame secured to said support and adapted to move in translation along or rotate about mutually perpendicular lift, drag and rolling coordinate axes, respectively, due to forces exerted on a model being tested, a floating lever, linkage for transmitting forces in the plane of the lift axis from said frame to said lever and including links connected at a common point to said lever such that the sum of the components of force in said links along the axis of said lever equal the lift forces on said support and the sum of the components of force in said links acting normal to said lever in the plane of the second of said coordinate axis being a measure of the moment on said frame about the third coordinate axis, means connected normal to said lever at the point of connection of said links and connected to a moment balance, means for transmitting a force in the plane of said second coordinate axis from said frame to said lever, said last named means being connected to said link at a point spaced from the means connected to said moment balance such as to apply a force to said lever just equalizing the effect of a force thereon due to the moment produced by the force in the plane of the second coordinate axis and a balance connected to said lever for measuring the value of the force on said frame in the plane of said second coordinate axis.

2. In a wind tunnel balance system for measuring forces and moments on a model being tested, a model support, a floating frame secured to said support and having six degrees of freedom with respect to three mutually perpendicular lift, drag and rolling coordinate axes, a floating lever, a lift balance connected to said lever, linkage connected to said lever at a common point, said linkage being adapted to apply components of force therein along the axis of said lever and to apply components of force in planes at right angles to each other and normal to said lever at said common point as a measure of pitch and rolling moments respectively acting on said frame, pitch and rolling moment balances respectively connected to said lever common point in the respective planes of the application of the respective moment force components thereto, separate linkages for transmitting drag and side forces from said frame to said lever, said separate linkages being respectively connected to said lever at points spaced from said common point and adapted to produce a reaction at said point equal and opposite the net force thereon due to moments on said frame due respectively to drag and side force moments exerted on said frame, and drag and side force balances connected to said lever beyond the connection of said drag and side force linkages.

3. In a wind tunnel balance system, a model support, a floating frame secured to said support and movable along and rotatable about mutually perpendicular lift, pitch and roll coordinate axes respectively, a floating lever, means for transmitting a force to said lever from said frame, which force is a measure for the moment acting about one of said axes other than the vertical or lift axis, a moment balance connected to said lever at the point of connection of said last named means, a force measuring balance connected to said lever at a point spaced from connection of said moment balance thereto, a force transmitting linkage for transmitting forces acting on said frame in the plane of the other of said coordinate axes to said lever at a point intermediate the connection of the other of said balances therewith such that the reaction produced at the point of connection of said moment balance to said frame will be equal and opposite the force transmitted to said moment balance due to the moment of the force in the plane of said other co-ordinate axis.

4. In an aerodynamic balance system for wind tunnels of the character wherein a model is supported in the air stream on a support secured to a floating frame below the model, a pitch balance, means including a floating lever interconnecting said frame and said balance, a drag balance connected to said floating lever at a point spaced from the connection of said pitch balance thereto, means for transmitting drag force from said frame to said lever and to said drag balance, said last named means being connected to said lever so as to subtract from the force transmitted to said pitch balance a force equal to the effect of the pitching moment on said frame caused by the drag force.

5. In an aerodynamic balance system, a model support for supporting a model to be tested, a floating frame secured to said support, a pitching moment balance, linkage interconnecting said pitching moment balance and said frame, a drag balance, linkage means interconnecting said drag balance and said frame for transmitting drag forces acting on the frame to the balance, and a compensating lever connected in common to each of said linkages for applying a correcting force derived from said drag linkage to said pitching moment balance linkage to prevent the force due to the pitching moment due to the drag force acting on the model support from being transmitted to said pitching moment balance.

6. In an aerodynamic balance system, a model support for supporting a model to be tested, a floating frame secured to said support, a pitching moment balance, a rolling moment balance, a drag balance and a side force balance, separate force transmitting means interconnecting said frame and each of said balances and a compensating floating lever connected in common to each of said force transmitting means and operative to prevent the pitching moment due to drag force acting on said support and rolling moment due to side force acting on said support from being transmitted through said frame and associated force transmitting linkages to said pitching moment and rolling moment balances respectively.

7. In a wind tunnel balance of the character described a model support, a floating frame secured to said support and having six degrees of freedom with respect to three mutually perpendicular coordinate axes intersecting at a fixed moment center or point in space above said frame, separate yaw, pitch and rolling moment balances for measuring the moments about the respective axes, linkage means interconnecting the frame and balances including a floating compensating lever connected in common between said drag, side force, pitch and rolling moment balances such that the moments on the frame due to the drag and side force acting through the moment center are subtracted from the moments transmitted to the pitch and rolling moment balances whereby said balances measure the respective forces and moments acting on said model support with respect to said moment center, and means for shifting said model support vertically and longitudinally with respect to said frame to thereby shift the model with respect to the said fixed moment center.

8. The structure as claimed in claim 10, in which the model support is also rotatable in azimuth to vary the angle of the longitudinal axis of the model with respect to the direction of the air stream.

9. In an aerodynamic balance for wind tunnels, a model support, a floating frame secured to said support and adapted to move in translation along and rotate about mutually perpendicular lift, drag and rolling coordinate axes, respectively due to forces exerted on the model being tested, a floating lever universally pivotally supported at one end from a lift force weighing arm, said lever being movable along its own axis as well as being movable in any plane normal to its axis, rods universally connected to said floating lever so that their lines of action intersect at a common point at the axis of said lever, said rods being inclined to form a pyramid to transmit components of forces to said lever parallel and normal to the axis thereof, linkage connecting the floating frame to said rods to transmit all forces thereto due to lift, pitching and rolling moments acting on the model, pitch and rolling moment balances connected to said floating lever in planes at right angles to each other and intersecting at the point of connection of said rods to the floating lever, and separate drag and side force load transmitting means connected to said floating frame and connected to said floating lever at points spaced from the connections of the moment balances thereto such that the transmitted drag and side forces produce forces, at the connections of the pitch and rolling moment balances respectively to the floating lever, neutralizing the effect of the drag and side forces on the pitching and rolling moment forces exerted on the floating frame by the model.

HERBERT M. HEUVER.

REFERENCES CITED

The following references are of record in the file of this patent:

UNITED STATES PATENTS

| Number | Name | Date |
|---|---|---|
| 1,404,920 | Zahm | Jan. 31, 1922 |
| 1,710,135 | Zahm | Apr. 23, 1929 |
| 1,980,195 | Gerhardt et al. | Nov. 13, 1934 |
| 2,353,033 | Hem | July 4, 1944 |